United States Patent [19]

Tibbs

[11] 4,026,367
[45] May 31, 1977

[54] FORWARD ANGLE PLOW SWEEP WITH ELEVATED TRAILING WING EDGE

[76] Inventor: Robert C. Tibbs, 508 Johnson Drive, Cleveland, Miss. 38732

[22] Filed: June 5, 1975

[21] Appl. No.: 584,194

[52] U.S. Cl. .............................. 172/730; 172/731; 172/771
[51] Int. Cl.² ...................................... A01B 39/20
[58] Field of Search .......... 172/771, 765, 769, 770, 172/720, 721, 760, 766, 722, 724, 726, 727, 728, 730, 731, 786

[56] References Cited

UNITED STATES PATENTS

| 122,885 | 1/1872 | Glenn | 172/727 X |
|---|---|---|---|
| 147,633 | 2/1874 | Haiman | 172/730 |
| 306,354 | 10/1884 | Schulz | 172/724 X |
| 383,402 | 5/1888 | Martin | 172/724 |
| 447,305 | 3/1891 | Fish | 172/730 X |
| 788,137 | 4/1905 | Huxford | 172/724 |
| 903,684 | 11/1908 | Davis | 172/730 X |
| 1,354,264 | 9/1920 | Miller | 172/786 |
| 3,797,582 | 3/1974 | Couch | 172/786 X |

FOREIGN PATENTS OR APPLICATIONS

| 136,106 | 5/1960 | U.S.S.R. | 172/730 |

Primary Examiner—Paul E. Shapiro
Attorney, Agent, or Firm—Clarence A. O'Brien; Harvey B. Jacobson

[57] ABSTRACT

A plow sweep construction comprising a generally horizontal plate is provided. The plate includes front and rear marginal edges extending longitudinally of the plate and the center portion of the rear marginal edge includes an integral rearwardly and upwardly projecting mounting shank portion spaced substantially centrally intermediate the opposite ends of the plate and provided for attachment to and support from a tool support member. The front marginal edge portion defines a substantially horizontal edge facing forwardly and the, blade member, at least for the most part, is transversely rearwardly and upwardly inclined. The mounting shank portion includes a lower end portion merging smoothly into the longitudinal central portion of the blade member and the lower end portion and the longitudinal central portion of the blade member, including the front marginal portion thereof, being forwardly convex. Still further, the front marginal edge portion of the blade member includes generally straight relatively angulated opposite end portions defining a forwardly opening included angle of between 90° and 180° with the preferred included angle lying between 135° and 170°. The portions of the rear marginal edge portion of the blade member on the opposite sides of and adjacent the lower portion of the mounting shank portion are downwardly depressed so as to be generally horizontally disposed.

2 Claims, 4 Drawing Figures

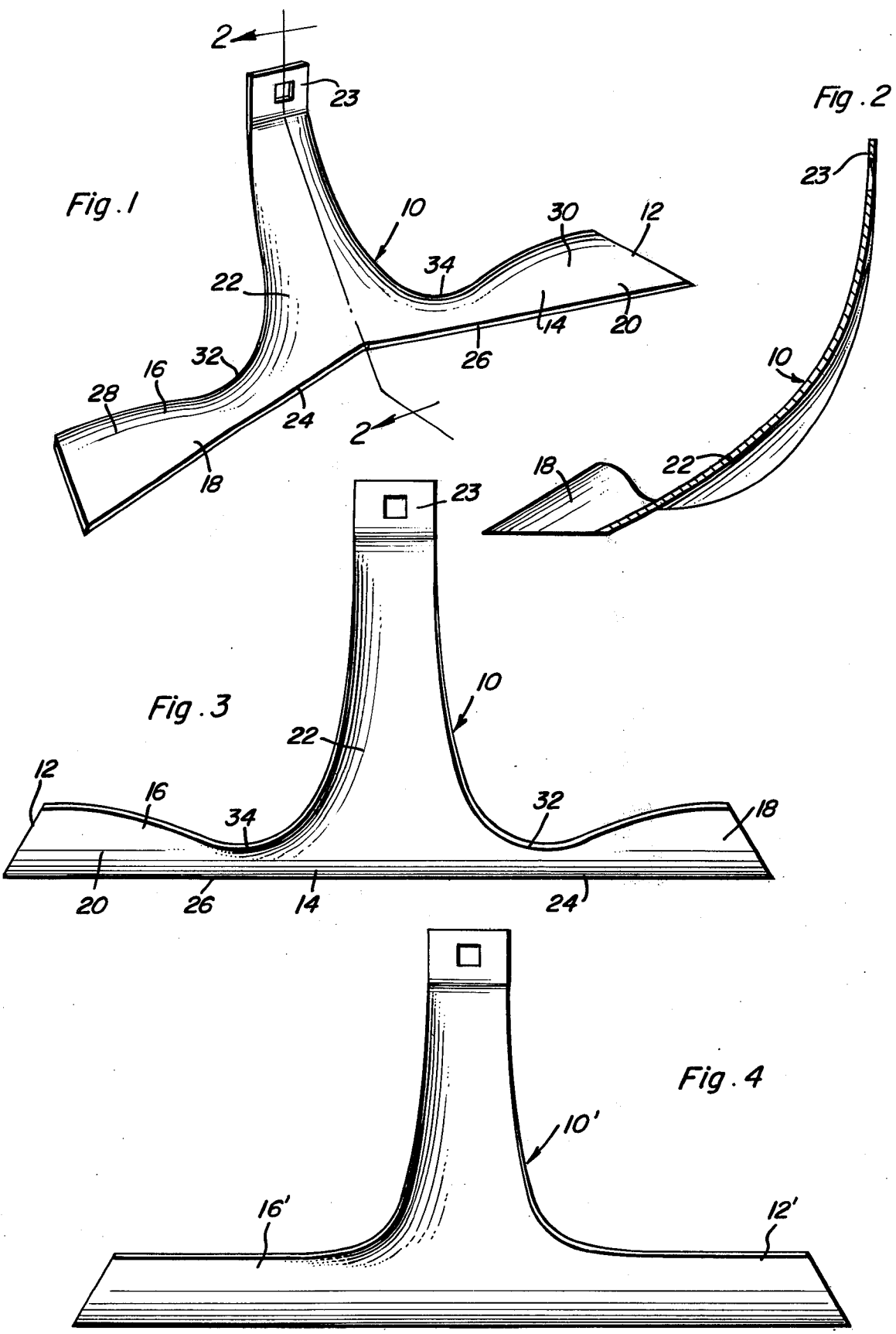

FORWARD ANGLE PLOW SWEEP WITH ELEVATED TRAILING WING EDGE

BACKGROUND OF THE INVENTION

In cultivating row crops in which a band of herbicide has been applied along the plant rows, it is desirable to cultivate the ground between the rows in a wide path extending up to the herbicide band and without throwing soil from the cultivator center path onto the herbicide treated band. However, substantially all conventional forms of plow sweeps and other cultivating devices tend to scatter the soil being cultivated outwardly of the center path of the soil cultivating tool onto the adjacent herbicide bands. In order to counteract this throwing of cultivated dirt onto the herbicide bands, plow sweeps and other soil cultivating tools have been provided with rearwardly extending opposite side winds including inwardly directed rear end portions to constrain the cultivate soil and to thereafter direct the cultivated soil back in toward the center of the path of movement of the cultivating device. However, these additional wings represent additional cost factors, additional maintenance problems and are not necessarily wholly effective in performing the desired function.

Examples of plow sweeps similar to the instant invention are disclosed in U.S. Pat. Nos. 336,420, 403,118, 539,289, 1,244,418 and 1,743,296.

BRIEF DESCRIPTION OF THE INVENTION

The plow sweep of the instant invention has a plan shape which is generally rectangular including front and rear longitudinal edges. However, the forward longitudinal edge includes generally straight and relatively angulated opposite end portions defining a forwardly opening included angle of between 135° and 170°. The central portion of the rear marginal edge of the plate includes an integral upwardly projecting mounting shank portion and the opposite ends of the plate disposed on opposite sides of the mounting shank portions are, for the most part, rearwardly and upwardly inclined.

As the plow sweep is moved forwardly closely beneath the surface of the ground, the forwardly opening angle defined by the opposite ends of the forward longitudinal edge initially deflect the soil acted upon by the sweep inwardly toward the central upstanding mounting shank portion and the rearward and upward inclination of the opposite end portions of the sweep further accelerate inward movement of the cultivated soil.

The main object of this invention is to provide an improved cultivator plow sweep which will be capable of performing all the cultivating operations between rows of plants having bands of herbicide extending therealong and without the soil in the path of the cultivator sweep being scattered laterally outwardly onto the adjacent bands of herbicide.

Another object of this invention, in accordance with the immediately preceding objects, is to provide an improved cultivator sweep which will be effective in the prevention of laterally outwardly scattering the soil cultivated thereby even through the cultivator sweep may make a deep cut in the ground to be cultivated.

Another important object of this invention is to provide a cultivator sweep construction which may be readily attached to various forms of depending tool support shanks.

A final object of this invention to be specifically enumerated herein is to provide a plow sweep in accordance with the preceding objects and which will conform to conventional forms of manufacture, be of simple construction, and easy to use so as to provide a device which will be economically feasible, long lasting and relatively trouble free in operation. These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a first form of plow sweep constructed in accordance with the present invention;

FIG. 2 is a vertical sectional view taken substantially upon the plane indicated by the section line 2—2 of FIG. 1;

FIG. 3 is an enlarged rear elevational view of the plow sweep illustrated in FIGS. 1 and 2; and FIG. 4 is a rear elevational view of a second modified form of the plow sweep constructed in accordance with the present invention.

DETAILED DESCRIPTION OF THE INVENTION

Referring now more specifically to the drawings, the numeral 10 generally designates a first form of plow sweep constructed in accordance with the present invention. The plow sweep 10 includes a generally horizontal plate 12 including front and rear marginal edge portions 14 and 16. The front marginal edge portion 14 includes two generally straight opposite end portions 18 and 20 disposed on opposite sides of a center front to rear extending vertical plane disposed centrally intermediate the opposite side marginal portions of the plate 12 and the central portion of the rear marginal edge portion 16 includes an integral rearwardly and upwardly inclined mounting shank portion 22 including an apertured upper terminal end 23 for attachment to the lower end of a dependingly supported tool support shank (not shown) which may comprise a part of any conventional form of cultivator assembly.

From FIG. 1 of the drawings, it may be seen that the opposite end portions 18 and 20 of the forward marginal edge portion are forwardly inclined toward their remote ends and define somewhat sharpened relatively angulated forward edges 24 and 26, respectively. The forward edges 24 and 26 may define an included angle of between 90° and 180° but preferably define an included angle of between 135° and 170°.

The plate 12 includes opposite end portions 28 and 30 disposed on opposite sides of the mounting shank portion 22 and the opposite end portions 28 and 30 are rearwardly and upwardly inclined approximately 30° relative to the horizontal. However, those portions of the rear marginal edge portion 16 disposed on opposite sides and adjacent the lower portion of the mounting shank portion 22 are downwardly depressed as at 32 and 34 so as to be substantially horizontally disposed.

In operation, as the sweep 10 is forwardly advanced with the plate 12 disposed slightly beneath the surface of the ground, the ground acted upon by the opposite end portions 28 and 30 is initially lifted upwardly and inwardly by the edges 24 and 26 and then further accelerated upwardly and inwardly by the rearward and upward inclination of the opposite end portions 28 and 30. However, in order to prevent lateral outward scattering of the cultivated soil directed rearwardly and inwardly immediately adjacent the lower portion of the mounting shank portion 22, the portions of the rear marginal edge 16 disposed on opposite sides of and closely adjacent the mounting shank portion 22 are downwardly depressed as at 32 and 34. This prevents the base or lower end portion of the mounting shank portion 22 from laterally outwardly scattering those portions of soil cultivated by the middle portion of the cultivator 10. Also, the lower end portion of the mounting shank portion 22 and the adjacent portions of the forward marginal edge 14 of the plate 12 are forwardly convexed. Thus, the downwardly depressed portions 32 and 34 function to define channels through which substantially all of the soil acted upon by the center third of the sweep 10 may be discharged rearwardly.

With attention now invited more specifically to FIG. 4 of the drawings, there will be seen a modified form of sweep referred to in general by the reference numeral 10' and which includes many structural features thereof corresponding to the various structural features of the sweep 10 and which are designated by prime reference numerals corresponding to those numeral given the corresponding components of the sweep 10.

The only difference between the sweep 10' and sweep 10 is that the rear marginal edge portion 16' does not include portions corresponding to the downwardly depressed portion 32 and 34 of the sweep 10. Thus, the entire length of the plate or blade 12' is rearwardly and upwardly inclined approximately 30° relative to the horizontal.

Nevertheless, the operation of the sweep 10' is substantially the same as the operation of the sweep 10, but the sweep 10 is capable of moving forwardly at a higher rate of speed without the lower end of the shank portion 22 thereof causing the laterally deflection of soil cultivated by the sweep 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A plow sweep including generally horizontal elongated blade member having opposite ends and front and rear marginal edge portions, an integral mounting shank portion projecting upwardly from the longitudinal central portion of the rear marginal edge portion for attachment to and support from a tool support member, said front marginal edge portion defining a substantially horizontal edge facing forwardly, said blade member at least for the most part, being transversely rearwardly and upwardly inclined, said mounting shank portion including a lower end portion merging smoothly into the longitudinal central portion of said blade member, said lower end portion and the longitudinal central portion of said blade member, including the front marginal edge portion thereof, being forwardly convex, said front marginal edge including generally straight relatively angulated opposite end edge sections defining a forwardly opening included angle of between 135° and 170°, the central portions of the rear marginal edge portions of said blade member adjacent and on opposite sides of said mounting shank portion being downwardly depressed, into generally horizontally disposed positions, relative to the rear marginal edge portion areas of said blade member at the opposite end portion of said blade member, whereby the soil acted upon by the central one-third portion of the blade including the adjacent end portions of said edge sections, the lower end portion of said shank portion and said depressed portions will be channeled over the latter and the soil acted upon by the free end portions of said blade member outwardly of said depressed portions will be accelerated upwardly and inwardly over the channeled soil and into the central area of the path of movement of the sweep behind the mounting shank portion.

2. The combination of claim 1 wherein said plow sweep is constructed of a single plate of metal of substantially constant thickness.

* * * * *